(12) United States Patent
Wanis et al.

(10) Patent No.: US 8,166,819 B2
(45) Date of Patent: May 1, 2012

(54) STANDING WAVE FIELD INDUCED FORCE

(75) Inventors: Sameh Sadarous Wanis, Redondo Beach, CA (US); Hiroshi Komine, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 950 days.

(21) Appl. No.: 12/220,345

(22) Filed: Jul. 24, 2008

(65) Prior Publication Data
US 2010/0018863 A1    Jan. 28, 2010

(51) Int. Cl.
*G01H 17/00* (2006.01)
(52) U.S. Cl. .......................................... 73/570.5; 73/574
(58) Field of Classification Search .................. 73/570.5, 73/571, 574, 61.75
See application file for complete search history.

(56) References Cited

U.S. PATENT DOCUMENTS

| | | | | |
|---|---|---|---|---|
| 2,880,337 | A | * | 3/1959 | Marrison et al. ............ 313/359.1 |
| 4,475,921 | A | | 10/1984 | Barmatz |
| 4,549,435 | A | | 10/1985 | Barmatz et al. |
| 4,800,756 | A | | 1/1989 | Barmatz et al. |
| 4,948,497 | A | | 8/1990 | Ohkawa |
| 4,964,303 | A | | 10/1990 | Barmatz et al. |
| 5,831,166 | A | * | 11/1998 | Kozuka et al. .................. 73/570 |
| 6,029,519 | A | * | 2/2000 | Kuklinski ..................... 73/570.5 |
| 7,108,137 | B2 | * | 9/2006 | Lal et al. ........................ 209/659 |
| 7,837,040 | B2 | * | 11/2010 | Ward et al. ..................... 209/210 |
| 7,846,382 | B2 | * | 12/2010 | Strand et al. ...................... 422/20 |
| 2003/0186522 | A1 | | 10/2003 | Duan et al. |
| 2009/0139332 | A1 | * | 6/2009 | Goddard et al. ................. 73/570 |

FOREIGN PATENT DOCUMENTS

| | | |
|---|---|---|
| EP | 0 633 049 A | 1/1995 |
| WO | WO 90/05008 | 5/1990 |
| WO | WO 00/51186 A | 8/2000 |
| WO | WO 2006/016914 A | 2/2006 |
| WO | WO 2006/103671 A | 10/2006 |

OTHER PUBLICATIONS

Wanis, Sameh S.;Tailored Force Fields for Flexible Fabrication; A Dissertation Presented to the Academic Faculty; In Partial Fullfillment of the Requirements for the Degree of Doctor of Philosophy in Aerospace Engineering; Georgia Institute of Technology, May 2006; Copyright 2006 by Sameh S. Wanis; USA.
Wu, Junru; Acoustical Tweezers; J. Acoustical Society of America; May 1991; pp. 2140-2143; vol. 89, No. 5; Acoustical Society of America; USA.
Wanis, S. et al; Acoustic Shaping in Microgravity; AIAA 98/1065; Presented at the AIAA 36th Aerospace Science Meeting; 1997; 6 pages; American Institute of Aeronautics and Astronautics by permission; USA.

(Continued)

*Primary Examiner* — J M Saint Surin
(74) *Attorney, Agent, or Firm* — Carmen Patti Law Group LLC

(57) ABSTRACT

At least one transducer of an apparatus in one example is configured to generate a first standing wave field within a cavity. The first standing wave field exerts a first field-induced force to cause a plurality of particles within the cavity to align in a desired configuration. The at least one transducer is configured to generate a second standing wave field within the cavity. The second standing wave field causes one or more of the plurality of particles within the cavity to fuse into the desired configuration.

25 Claims, 6 Drawing Sheets

OTHER PUBLICATIONS

Wanis, S. et al; Acoustic Shaping in Microgravity: Higher Order Surface Shapes; AIAA 99/0954; Presented at the AIAA 37th Aerospace Sciences Meeting; 1999; 7 pages; Published by AIAA with permission; USA.

Wanis, S. et al; Acoustic Shaping: Application to Space Based Construction; AIAA Paper 00/1020; 5 pages; 1999; American Institute of Aeronautics and Astronautics; USA.

Neuman, Keir C. et al; Optical Trapping; Review of Scientific Instruments; vol. 75, No. 9; Sep. 2004; pp. 2787-2809; American Institute of Physics; USA.

Komerath, Narayanan M. et al; Tailored Force Fields for Space-Based Construction; STAIF 02-084; In proceedings of Space Technology and Applications International Forum (STAIF 2002); USA.

Xiaole, Mao et al; Focusing Fluids and Light, Enabling Technologies for Single-Particle Detetionin the Micro-Nanoscale; IEEE Nanotechnology Magazine; Mar. 2008; pp. 22-27.

Coakley, W. Terence et al; Ultrasonic Manipulation of Particles and Cells, Ultrasonic Separation of Cells; Bioseparation 4; pp. 73-83; 1994; Kluwer Academic Publishers; Printed in the Netherlands.

Hawkes, Jeremy J. et al; Microparticle Manipulation in Millimetre Scale Ultrasonic Standing Wave Chambers; Elsevier Ultrasonics 36; 1998; pp. 925-931; 1998 Elsevier Science V.V.; PII: S0041-624X(98)00019-5.

Wen Pei Lim, et al; Alignment of Carbon Nanotubes by Acoustic Manipulation in a Fluidic Medium; J. Phys. Chemc. C, vol. 111, No. 45, Oct. 24, 2007; pp. 16802-16807; XP002543114.

\* cited by examiner

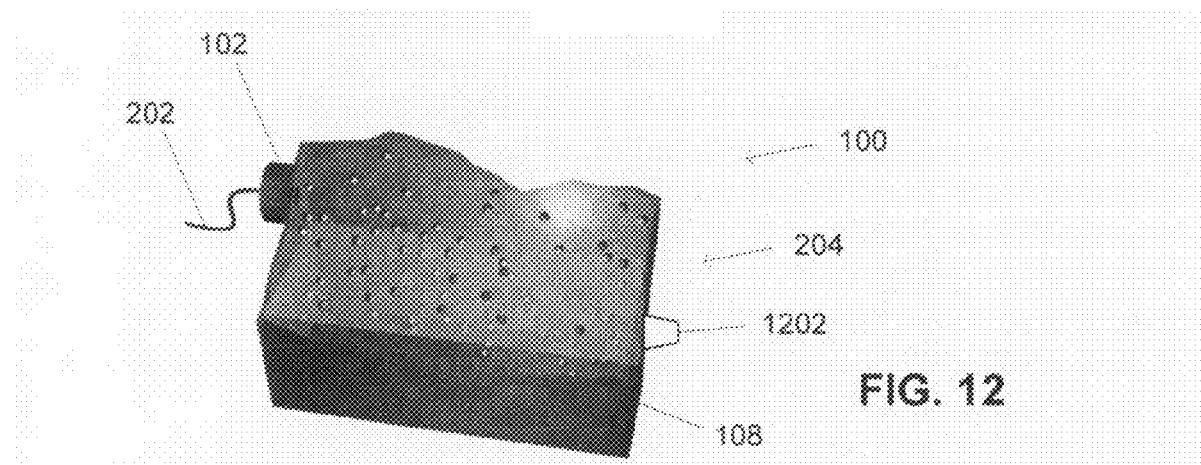
FIG. 12
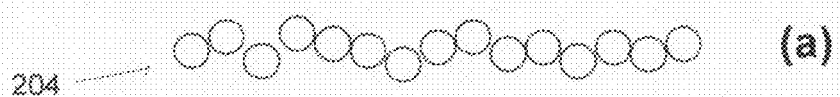
(a)
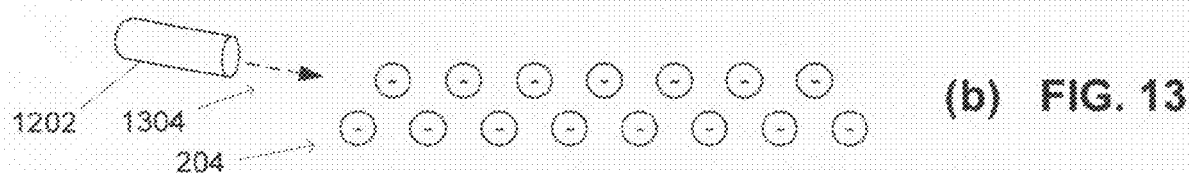
(b) FIG. 13
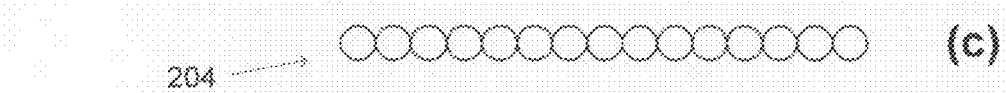
(c)

STANDING WAVE FIELD INDUCED FORCE

TECHNICAL FIELD

The invention relates generally to wave fields and more particularly to forces induced on particles within a wave field.

BACKGROUND

Due to the fundamental principle that waves carry energy and momentum with no net mass transport, a particle with different impedance than its host medium will, in general, scatter a portion of an incident wave. The resulting rate of change of both linear momentum and energy density of the wave induces forces on that particle. Previous research has shown that optical or acoustic waves (or beams) can be used to trap single particles within a well or align particles within a flow. For example, "acoustical tweezers" operate by generating a stable potential well with two focused ultrasonic beams propagating along opposite directions. Latex particles were trapped in the potential well and could then be moved axially or laterally by moving one of the focusing transducers that generate the ultrasonic beam. Additional studies show levitation, positioning, and rotation of objects using acoustic waves.

SUMMARY

The invention in one implementation encompasses an apparatus. The apparatus comprises at least one transducer configured to generate a first standing wave field within a cavity. The first standing wave field exerts a first field-induced force to cause a plurality of particles within the cavity to align in a desired configuration. The at least one transducer is configured to generate a second standing wave field within the cavity, wherein the second standing wave field causes one or more of the plurality of particles within the cavity to fuse into the desired configuration.

Another implementation of the invention encompasses an apparatus. The apparatus comprises at least first and second transducers. The first transducer is configured to generate a first standing wave field within a cavity. The second transducer is configured to generate a second standing wave field within the cavity. The first and second transducers cooperate to employ the first standing wave field and the second standing wave field to induce respective first and second field-induced forces to cause a set of particles within the cavity to align in a desired configuration.

Yet another implementation of the invention encompasses an apparatus. The apparatus comprises at least one transducer configured to generate a standing wave field within a cavity. The standing wave field exerts a field-induced force to cause a set of particles within the cavity to align in a desired configuration. The apparatus comprises at least one same-charge source configured to induce a monopole field in one or more particles of the set of particles to adjust a distribution of the set of particles within the desired configuration.

A further implementation of the invention encompasses an apparatus. The apparatus comprises at least one transducer configured to generate a standing wave field within a cavity. The standing wave field exerts a field-induced force to cause a set of particles within the cavity to align in a desired configuration. The apparatus comprises at least one transducer configured to send a wave through the cavity at a resonant frequency of the set of particles to induce a resonant response in the set of particles. The resonant response causes an increase in a dipole field of the set of particles. The increase in the dipole field increases a field-induced force exerted by the standing wave field on the set of particles.

DESCRIPTION OF THE DRAWINGS

Features of example implementations of the invention will become apparent from the description, the claims, and the accompanying drawings in which:

FIG. 12 is a representation of another implementation of the apparatus of FIG. 2 and further illustrates a same-charge source.

FIGS. 13 a, b, and c are representations of the same-charge source of FIG. 12 and illustrates re-alignment of the particles based on a temporary induced monopole charge.

DETAILED DESCRIPTION

Figure 1:
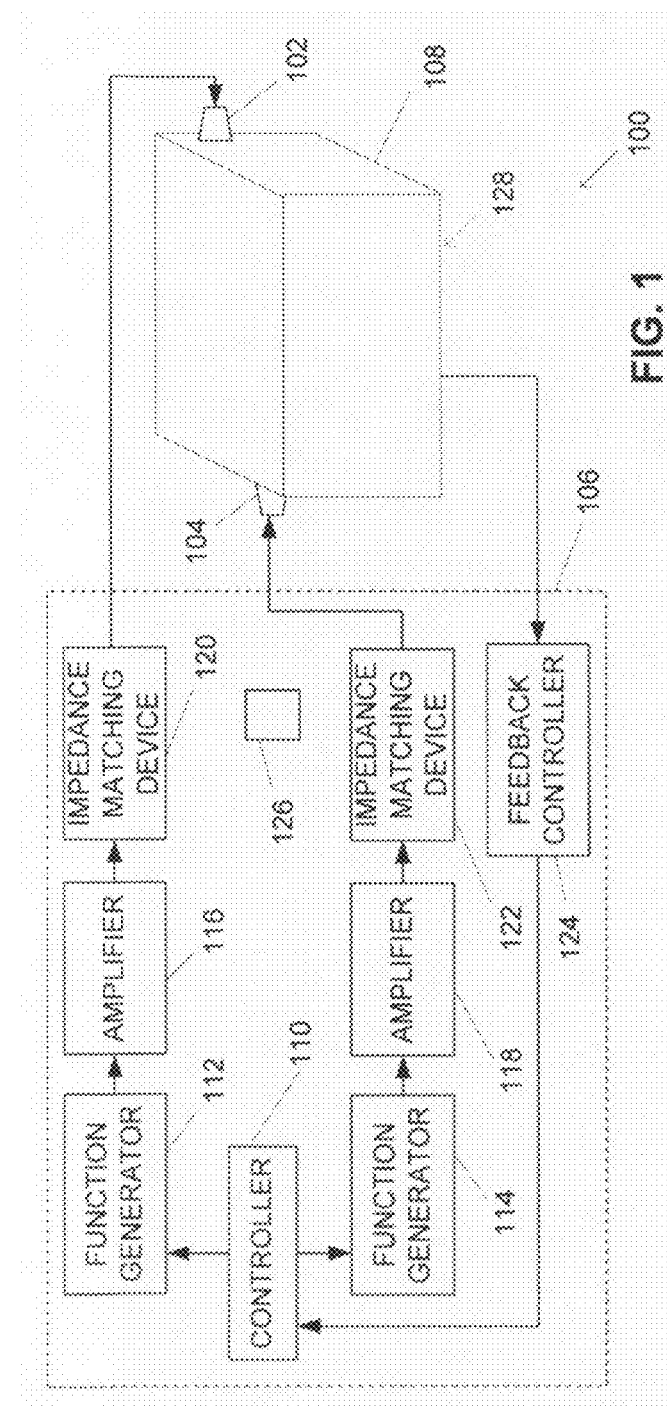
FIG. 1 is a representation of one implementation of an apparatus that comprises one or more transducers, a wave controller, and a cavity.

By their nature as waves, sound and electromagnetic fields carry energy and momentum with no net mass transport. These waves are used to create force fields which can be used as a flexible fabrication tool. One example of force fields used for flexible fabrication is disclosed by Wanis in a dissertation entitled "Tailored Force Fields for Flexible Fabrication" (Georgia Institute of Technology; May 2006; http://smartech-.gatech.edu/handle/1853/10540), the disclosure of which is hereby incorporated by reference. The fields are created within appropriate resonators or cavities such that standing waves are created within the cavity, whereby stable surfaces of particles within the cavity can be formed. The shape of the stable surfaces can be tailored by exciting different resonant modes of the cavity. Acoustic experiments in the audible frequency range showed that randomly placed particles within a resonant cavity formed stable surfaces. Straight and curved walls (e.g., surfaces) were created out of a wide variety of material types. In the experiments, the surface produced was always single-particle thick irrespective of the size of the particles. The particles were observed to attract each other enabling continuous surfaces to be formed with gaps being filled. These interparticle forces were attributed to secondary scattering. The pressure field within the cavity was predicted to first order using the solution to the 3D unforced Helmholtz equation with rigid boundary conditions.

The theory of electromagnetic manipulation of nanoparticles using laser beams has been found to be analogous to the theory of acoustic shaping. Alternating electric fields such as those in a microwave or radio wave were studied in the context of utilizing them to induce scattering and gradient forces on electrically-neutral particles. A neutral dielectric particle in the Rayleigh regime will become polarized in response to the external electric field set up across it. In the electrostatic limit, i.e. Rayleigh regime, this polarization causes the particle to appear as an electric dipole. The well known field radiated by a dipole is used to model the behavior of particles in a standing electromagnetic wave field. The forces onto a particle in response to the imposed external field are called primary forces. Secondary forces arise from the interaction of the particles with each other and results in regions of attraction and repulsion. Both primary and secondary forces are found to be analogous to the forces in acoustics. The analogy between acoustics and electromagnetics is found to be through the force expressions dependency on wavelength; scattering particle radius; separation distance; energy density of the field; impedance mismatch with the host medium; and field intensity. Experiments on secondary forces in acoustic resonators, single particles in microwave resonators, and chain formation using neutral cells at the micro-scale, all validate the generalized formulation and understanding of field force tailoring.

The surface formation process in electromagnetics is found to be different from that in acoustics due to the secondary force interparticle behavior. In acoustic fields, each particle produces attractive forces in two dimensions and repulsion along the third. In electromagnetics we expect to have attractive forces in one dimension only and repulsion along the other two. While surfaces can be formed in acoustic, chains would be formed in electromagnetics. These chains could then be assembled together to form complete surfaces. Scaling the particles down to the nanoscales involves a detailed study of the forces that start to dominate at those scales. The effort is in summary a study of whether field induced forces can overcome the other competing forces at the nanoscales and if so, can they be harnessed to shape structures of interest.

As nanoscale engineering has progressed over the technology's lifetime, researchers have devised a number of ways of manipulating and fabricating nanoscale subjects. Since "nano" takes place at a molecular scale, surface chemistry supersedes volume properties as the source of defining characteristics. Forces such as van der Waal's and electrostatics dominate particle behavior. Imagers must utilize new techniques which surpass the diffraction limit of light. The technologies we refer to when we speak of nanomanipulation achieve 1-D, 2-D, and 3-D control in this new domain.

Today, the driving force behind nanoscale technology is the market for new and better products. One of the best examples of a market converging on nanotechnology is the integrated circuit industry, where the ability to create smaller chip features inevitably means faster, cheaper, and less power-hungry chips. Over time, macro-features are squeezed to micro-features, and microfeatures are, in turn, squeezed to nano. This is an approach that illustrates a top-down methodology. System assembly originates at the macro scale, cutting and milling larger pieces down to nano-size. Bottom-up methodology, on the other hand, involves letting molecular reactions run the show, allowing molecules to arrange themselves according to a useful design. Examples of bottom-up nanoassembly include carbon nanotube fabrication and other types of nanowire growth, metallic nano-clusters formed by laser ablation, and steps in the production of various types of colloidal products such as sunscreen. Some predict that as understanding of self-assembly increases, manufacturing of nanoproducts will shift from a top-down to a bottom-up approach, replacing complex and expensive techniques with simpler, more cost-effective ones. The concept of field induced forces is seen to lie somewhere in the green region as it has features of both the top-down and bottom-up methodologies.

The concept of field induced forces is based on the fundamental principle that waves carry energy and momentum with no net mass transport. A general particle with different impedance than its host medium will, in general, scatter a portion of an incident wave. The resulting rate of change of both linear momentum and energy density of the wave induces forces on that particle. This is considered to be only a second order effect (i.e. proportional to the wave's intensity and intensity gradient); thus, the forces that can be generated from waves can only be significant at finite (noninfinitesimal) amplitudes. The two types of wave motion that have been studied are acoustic and electromagnetic fields.

Acoustic fields were used to manipulate a large number of small particles into ordered shapes. By small it is implied that the length scale of each particle is small relative to the field wavelength. The sound waves were set up in a resonator (e.g., cavity) to achieve a larger sound intensity and a standing wave pattern. The shape the particles form is determined by the specific resonant mode being excited by the source (e.g., a transducer). The resulting capability is a non-contact and flexible fabrication technology. It should be noted that the manner in which constituent particles collect into desired shapes is a "parallel" rather than a "serial" process. The "parallel" response is because all the particles experience forces all at the same time, depending on their location within the force field, and migrate to regions of minimum potential collectively as opposed to one by one. For this reason and in comparison to current techniques, this aspect of the technology is seen as an enabler for nanofabrication.

Acoustic forces are induced onto small particles as they scatter the incident field based on their relative impedance to the host fluid. These forces are broken down into primary and secondary forces. Primary forces are responsible for collecting the particles towards regions of minimum potential into certain shapes, while the secondary forces describe the interparticle forces which govern the final form of the surface formed. Both are equally important to the whole process of shaping structures using field induced forces.

The primary force field can be broken down into two forces that can be exerted onto a small particle in a sound field. A force is generated due to the rate of change of linear momentum due to the scattering of the wave off of the particle and is thus always pointed away from the source. This force is usually only important when one is dealing with traveling wave dynamics. The other force is generated due to the scattered field radiating away from the particle and interacting with the incident wave to produce variations in the energy density of the field. This force goes as the negative gradient of the energy density (i.e. can thus push or pull a particle away from a source) and is the force that we are concerned with for this research project. The conservative nature of the acoustic force field in a standing wave allows for a potential to be defined. Using this approach allows for non-planar wave fields which are attractive for our research since we are interested in exciting various normal modes of general cavities for which all mode shapes have curved wave forms with the exception of axial modes in rectangular and cylindrical cavities. The assumptions used in the derivation are that the particle size be much smaller than the wavelength and much larger than the acoustic boundary layer formed on the particle due to the acoustic particle velocity. The force is found by taking the negative gradient of a force-potential, U, such that $F=-\nabla U$. The force-potential is given by, $$U = V\left[\langle PE \rangle f_m - \frac{3}{2} \langle KE \rangle f_d\right]$$

where V is the volume of the particle, $\langle KE \rangle$ and $\langle PE \rangle$ are the time-averaged kinetic and potential energy densities, $f_m$ and $f_d$ are the scattering monopole and dipole contributions, respectively. The monopole and dipole terms are governed by the particle's acoustic impedance relative to its host fluid, and are given by, $$f_m = 1 - \frac{\rho_o c_o^2}{\rho c^2} \text{ and } f_d = \frac{2(\rho - \rho_o)}{(2\rho + \rho_o)}$$

where the o subscript denotes host medium properties. After a few manipulations we arrive at the expression for the force on a given particle in a standing sound field with pressure field amplitude A, $$F = \frac{5}{8} V \left(\frac{5\rho - 2\rho_o}{2\rho + \rho_o} - \frac{\rho_o c_o^2}{\rho c^2}\right) \nabla \left(\frac{A^2}{\rho_o c_o}\right)$$

The other contribution to the force field which results from the rate of change of momentum is ignored in our work since we are working with standing waves and these forces become small in relation to the above derived energy density based forces. The momentum based forces scale as $k^4 a^6$ while the energy density based forces scale as $ka^3$, where k is the wavenumber and a is the particle radius.

The experimental data showed that at close range particles were experiencing another force not explainable by the primary force field. This led to a study of the forces known to exist in acoustic fields. By performing an order of magnitude estimate of these forces and comparing with the scales of our experiment, it was determined that "mutual radiation pressure" was the main contributor. This force comes from the influence of one particle's radiated field onto another particles incident field. Since the particle sizes are small only the monopole and dipole terms are significant. The force expression governing mutual radiation pressure is given by, $$F_s = 4\pi a^6 \left[\frac{(\rho - \rho_o)^2 (3\cos^2\theta - 1)}{6\rho_o d^4} v^2 - \frac{\omega^2 \rho_o (\beta - \beta_o)^2}{9 d^2} p^2\right]$$

Figure 15:
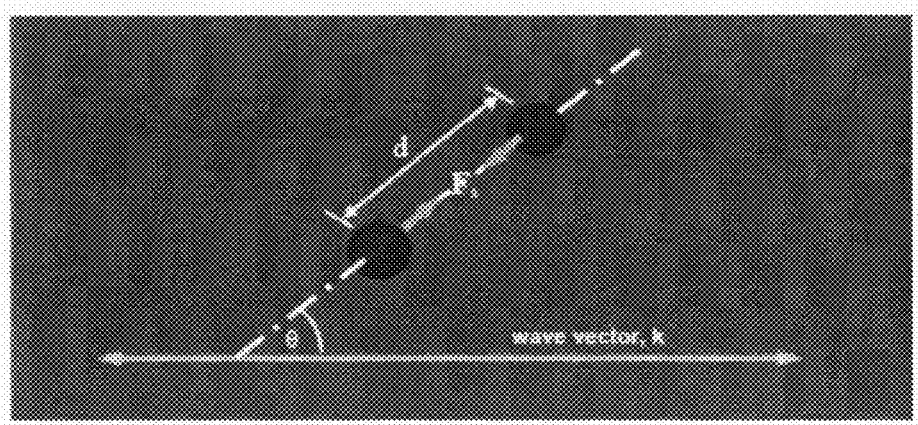
FIG. 15 is a representation of orientation of particles relative to a path of an acoustic particle velocity.

The first term is the dipole field contribution and the last term is the contribution from the monopole field. Clearly, the dipole term is highly directional, changing signs as the relative orientation between the particle separation d and the wave-vector k change indicating regions of attraction and regions of repulsion. FIG. 15 illustrates the angle θ, where at 90 degrees the force between the particles is attractive and at 0 degrees the force is repulsive.

Figure 3:
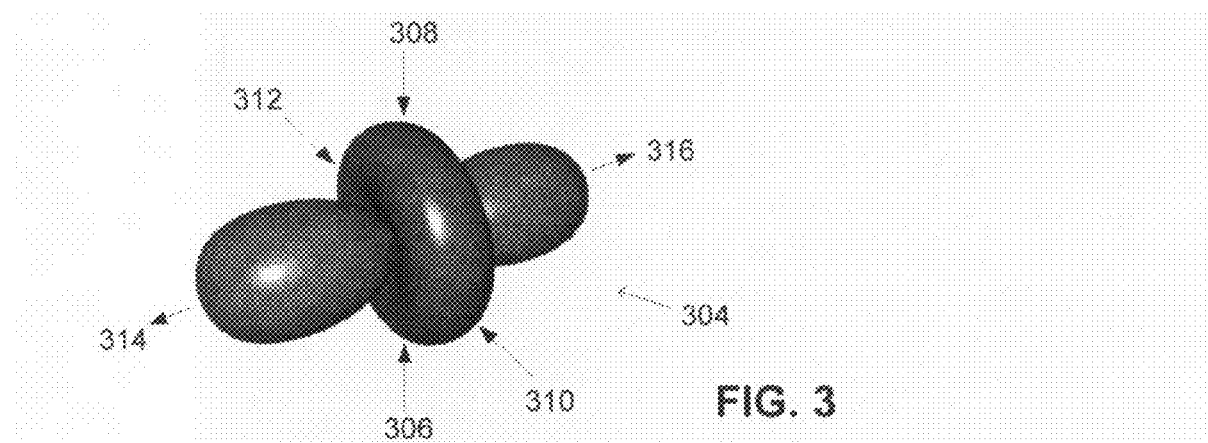
FIG. 3 is a perspective representation of a dipole field of a particle in an acoustic field of the apparatus of FIG. 2 and illustrates inter-particle forces due to the acoustic field.

For our experimental setup the monopole term was small relative to the dipole term. The main feature of this interparticle force is that it scales as the inverse 4th power of separation distance and is thus only effective at short ranges. This force is responsible for the formation of multiple surfaces and those surfaces being only single-particle thick. In 3-D the interparticle force profile is as shown in FIG. 3, described below.

As in the above discussion on acoustic primary forces, the primary force induced onto a small dielectric particle in an electromagnetic field can be broken into momentum based and energy density based forces. A neutral dielectric particle placed in an alternating electric field will polarize in response. The amount of polarization is determined by the ratio of the dielectric constant of the particle to the host medium, or, in more general terms, the ratio of impedances. This polarization can take place through one of several polarization mechanisms. In general, the act of polarization is done through the molecules responding by re-aligning or separating opposite charges by some small distance. This will be coherent as long as the wavelength is large relative to the particle diameter and will thus add up to make up the polarization vector.

These forces can be described using the Maxwell stress tensor. Starting with the well-known total electromagnetic force on a charged particle, also known as the Lorentz force, $$f = q(E + v \times B)$$

the electromagnetic force density f acting on a small dielectric particle or volume element with dipole moment density P is given by $$f = P\nabla E + \frac{\partial P}{\partial t} \times B$$

Solving for the dipole moment P becomes a boundary value problem and can be found in classical electromagnetics textbooks. Substituting the polarization value into the above equation and using Maxwell's relation, $\nabla \times E = -\partial B/\partial t$ gives the force on a dielectric particle $$F = \alpha_o \varepsilon_o (\nabla |E^2|/2) + \alpha_o \varepsilon_o \frac{\partial}{\partial t}[E \times B]$$

This force expression still contains the momentum based force in the second term. By taking the electrostatic limit, or long wavelength limit, Maxwell's relation can now become $\nabla \times E = 0$. This in turn cancels the second term and we are left with the first term only, which is the force due to energy density gradients. Comparing this with the force on a small particle in an acoustic field shows the strong similarity between the two force fields.

The response of a dielectric particle in an alternating electric field is polarization. An equivalent problem would be to replace the dielectric particle with a dipole having a dipole moment equal to the polarization of the dielectric. Thus, the behavior of multiple dielectric particles in an alternating electric field can be reduced to a problem of solving the interaction of multiple dipoles.

Figure 6:
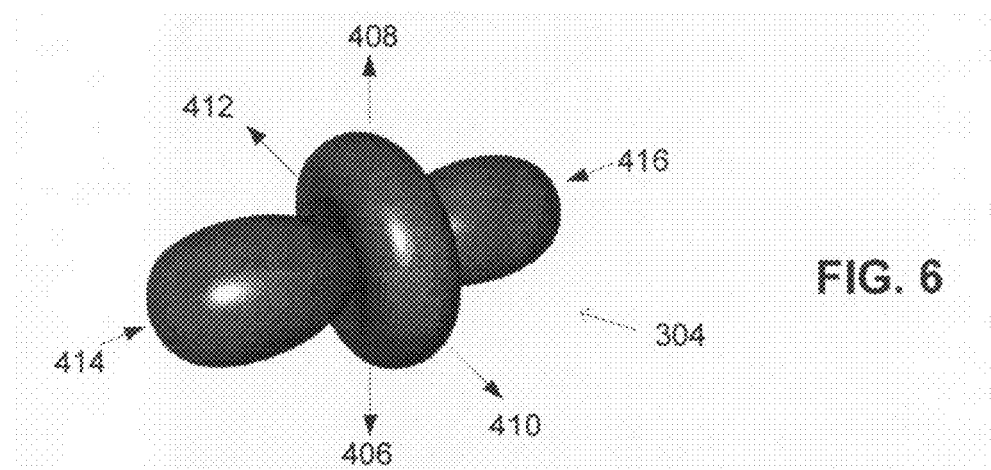
FIG. 6 is a perspective representation of a dipole field of a particle in an electromagnetic field of the apparatus of FIG. 2 and illustrates inter-particle forces due to the electromagnetic field.

The interaction of two electric dipoles is found by substituting the dipole field of one dipole as the electric field of the potential energy of the second dipole. This results in energy of interaction between two dipoles and the force is then found by simply taking the negative gradient. The force of interaction between two dipoles having polarizations $p_1$ and $p_2$, $$F_s = \frac{p_1 \cdot p_2}{r^4}[1 - 3\cos^2(\theta)]$$

where r is the separation distance and $\theta$ is the orientation of r relative to $p_1$ and $p_2$. The 3-D force profile is shown in FIG. 6, described below. Note that $p_1$ and $p_2$ are always parallel since they are induced dipoles and not permanent dipoles. By comparing this force expression to that given for acoustic fields reveals once again that the acoustic-electromagnetic analogy is existent for secondary force fields as well.

Recall that the primary acoustic forces are classified into traveling wave forces and standing wave forces. The electromagnetic primary forces consist of scattering and gradient forces. By examining these forces it becomes clear that the acoustic traveling force expression resembles the electromagnetic scattering force expression, and the acoustic standing wave force is very similar to that for the electromagnetic gradient force. In acoustics, the traveling wave force is a result of the momentum exchange that occurs when the wave collides with the particle and scatters off of its surface. This is a result of the difference in impedance between the host medium and the particle. It always points in the direction of the wave propagation for that reason. Clearly, these are the exact same characteristics of the electromagnetic scattering force.

Thus, we conclude that these two forces are analogous. The standing wave acoustic force is also found to be strongly analogous to the electromagnetic gradient force. This is evident when one considers what causes the force in the acoustic standing wave. The force is a result of the gradient in the Lagrangian energy density. In electromagnetics the force comes about as result of the Lorentz force acting on the induced dipole. However, if we take the gradient of the potential energy U that a dipole p has in an electric field E, such that $U=-p \cdot E$, we get $F=(p \cdot \nabla)E$. In other words, the Lorentz force is also derivable from the gradient of the energy as we did in acoustics. Likewise, we conclude that the standing wave acoustic force is analogous to the electromagnetic gradient force. A list is made in the following table showing the energy density based forces in both acoustic and electromagnetic fields and clearly the similarities are evident. The momentum based forces are also included for completeness.

Based on this similarity in expressions, a unified expression can be sought for the energy density based forces, $$F \sim V \Theta \nabla E,$$

where V is still the particle volume, $\Theta$ is the impedance mismatch between the particle and host medium, and E is the energy density.

We have shown that we can manipulate, hold, and cure a structure in an acoustic resonant field. By studying the analogy between acoustic and electromagnetic fields we were able to show the analogy that exists between the two force fields for both primary and secondary forces. The main distinction was shown to come from the secondary force fields that result in forming 3-D surfaces in acoustics and chains in electromagnetics. In the derivation of these force fields there was no constraint on the wavelength or particle size as long as the ratio between them was kept (small particles relative to wavelength). Scaling up or down this concept is thus seen as feasible from a force generation point of view.

As described herein, field induced forces can be induced onto small particles placed in a standing wave pattern utilizing both primary and secondary forces to achieve specific structures. These principles have applicability to nanofabrication and electromagnetic interaction with materials in general. Optical frequencies and their interaction with nanometallic particles are also relevant.

A preliminary literature review reveals that there are considerable efforts in using light waves to organize matter. For example, electric fields that varied from 10 Hz-10 MHz were used to orient and sort out metallic from semi-conducting carbon nanotubes. The interaction of light with metallic particles was shown to exhibit phenomenon of attraction between the particles in line with the secondary forces described above.

Figure 16:
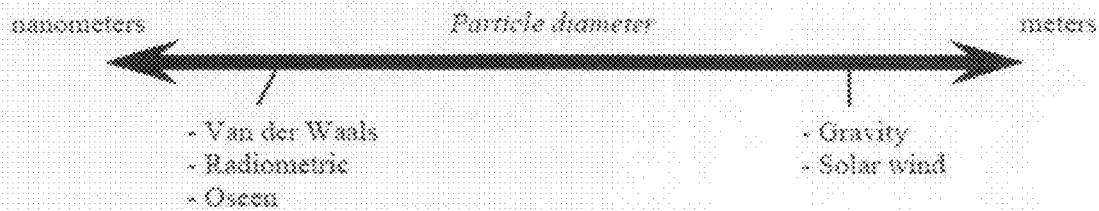
FIG. 16 is a representation of applicable forces at various scales of particles.

This provides a reference for what order of magnitude field forces are needed to overcome other forces of consideration at the nanoscales. In acoustics, many forces come into play such as: Oseen forces, Bjerknes forces, mutual radiation pressure, and acoustic wake forces. In electromagnetics, other forces besides the interparticle forces arising from dipole-dipole interaction are applicable. Forces common to nanoparticles embedded in either acoustic or electromagnetic fields comprise: radiometric forces, Brownian motion forces, Stokes drag, van der Waals forces, and repulsive electrostatic Derjaguin-Landau-Verwey-Overbeek forces. The relative strength of the forces on a particle are based on the size of the particle. Examples of the relevant strengths of the dominant forces at each range of particle sizes is shown in FIG. 16.

The field induced forces are based on the specific materials selected, which will dictate the dielectric properties. Based on work done in the literature on nanotechnology it is clear that the following three materials are of interest and have many applications: silver nanospheres, gold nanospheres, and car-

|  | Acoustics | Electromagnetics |
|---|---|---|
| $\nabla$ energy density | $F = \frac{5}{8} V \left( \frac{5\rho - 2\rho_o}{2\rho + \rho_o} - \frac{\rho_o c_o^2}{\rho c^2} \right) \nabla \left( \frac{A^2}{\rho_o c_o} \right)$ | $F = \frac{3}{4} V \left( \frac{\varepsilon - \varepsilon_o}{\varepsilon + 2\varepsilon_o} \right) \nabla (\varepsilon_o E^2)$ |
| Momentum transfer | $F = \frac{11\pi}{18}(k^4 a^6) \left( \frac{5\rho - 2\rho_o}{2\rho + \rho_o} - \frac{\rho_o c_o^2}{\rho c^2} \right) \frac{A^2}{\rho_o c_o^2}$ | $F = \frac{5}{3} \pi \varepsilon_o (k^4 a^6) \left( \frac{\varepsilon - \varepsilon_o}{e + 2\varepsilon_o} \right)^2 |E|^2$ | bon nanotubes. Carbon nanotubes have high tensile strength, high thermal conductivity with low thermal expansion coefficient, good electrical conductivity, while being highly flexible. This makes them attractive to the study of nanofabrication. However, they can behave as either metals or semiconductors depending on their dielectric properties which is dictated by their diameter and chirality. Metallic nanospheres such as Ag and Au are desirable since they have rather uniform dielectric properties and are much more polarizable, yielding higher field induced forces onto them. Aluminum nanospheres are also interesting due to the presence of aluminum oxide layer that covers the particles and act as an electric insulator (dielectric). In this case the aluminum particles would form a chain yet would act as a conductor to a DC field which may have interesting applications. Interest in Au and Ag nanowires would fall under the microelectronics industry as an example.

Another parameter to be considered to estimate field induced forces is the field intensity gradient, which when expanded out for a sinusoidal field variation (such as is the case of standing waves in rectangular cavities) results in a force expression that scales linearly with field intensity. The intensity in the resonator is governed by both the source power and resonator Q-factor.

To hold the structure in place once it is shaped under the action of the field, one possible method involves heating the particles once in place using a high frequency beam that was uncoupled from the shaping field. This is a function of the dielectric constant and dielectric loss of the material. The shaping field was predicted to be in the lower end of the frequency scale and the heating frequency was selected to correspond to a peak in the dielectric loss curve which was rather far removed from the shaping frequency by about two orders of magnitude higher. This allowed for an uncoupling between the shaping (or forcing) field and the heating (or curing) field. The same logic could potentially be applied to nanoscale fabrication. One possibility is that particles at the nanoscale level will be sufficiently attracted by the van der Waals forces to hold the nanoparticles in place once the field is switched off.

In one implementation, a simulation tool (e.g., software) may be written to simulate the behavior of particles in acoustic and/or electromagnetic fields. The simulation tool can also be used to understand and predict particle movement in the field and mutual interaction between the particles.

Fields such as metamaterials could benefit from this as manipulating matter at nanometer level scales may allow alteration or engineering of electromagnetic properties of an object. Another application could be the development of extremely sensitive sensors that may be fitted onto USAF UAV's for the purposes of chemical detection of hidden weapons, such as IED's. The concept here would entail a simple flow field that contains the air to be sampled and the field would be run orthogonal to the flow. Particulates suspended and convected in the air stream will experience different force magnitudes based on their dielectric properties. The result is that different species will migrate to the side walls each species following different trajectories. They can then be collected through ports at the walls placed at the specific locations that are predicted beforehand. On the molecular scale, if monomers can be manipulated, then polymers can be engineered based on controllable field patterns. This may then open the way for advanced synthetic chemistry. It is possible to think of shaping various polymers that could attach to various unwanted DNA's as a defensive mechanism that fights off bio-agents.

Turning to FIG. 1, an apparatus 100 in one example comprises at least one transducer, for example, transducers 102 and 104. The apparatus 100 further comprises a wave controller 106 and a cavity 108. The transducers 102 and 104 are configured to generate at least one wave field within the cavity 108. The at least one wave field comprises mechanical (e.g., acoustic) waves and/or electromagnetic waves. In one implementation, a single transducer may generate one or more waves in the cavity 108. In another implementation, multiple transducers may cooperate to generate one or more waves in the cavity 108. Referring to the implementation of FIG. 1, the transducer 102 is configured to generate a number n of acoustic waves within the cavity 108 and the transducer 104 is configured to generate a number m of electromagnetic waves within the cavity 108. Examples of the transducers 102 and 104 comprise antennas, micro-electromechanical structures (MEMS), loudspeakers, piezoelectric materials, laser or light emitting diodes, and others, as will be appreciated by those skilled in the art.

The wave controller 106 in one example comprises a controller 110, one or more function generators 112 and 114, one or more amplifiers 116 and 118, one or more impedance matching devices 120 and 122, and a feedback controller 124. The controller 110 in one example comprises a user interface device or computer terminal. In another example, the controller 110 comprises a stand-alone computer or server, for example, an automated or pre-programmed computer. The wave controller 106 in one example comprises an instance of a recordable data storage medium 126.

The wave controller 106 is communicatively coupled with the at least one transducer (e.g., transducers 102 and 104). The wave controller 106 in one example is configured to provide one or more signals to the transducers 102 and 104 to cause the transducers to generate the one or more waves. The controller 110 is configured to cause the function generators 112 and 114 to generate one or more desired output waveforms. For example, the controller 110 may indicate to the function generator 112 one or more waveform characteristics, such as frequency, phase, and amplitude, of a desired output waveform. Where more than one waveform is required, the function generator may comprise a plurality of channels, for example, one channel per waveform.

The function generator 112 in one example generates the desired output waveform and passes the desired output waveform to the amplifier 116 for amplification and/or filtering. The impedance matching device 120 receives an amplified waveform from the amplifier 116 and matches the impedance of the amplified waveform to the cavity 108, as described herein. The impedance matching device 120 is configured to match the impedance of the cavity so that it minimizes reflected power, as will be appreciated by those skilled in the art. In one example, this increases the transfer of power from the transducer 102 to the cavity 108, as will be appreciated by those skilled in the art. The impedance matching device 120 then passes an impedance-matched waveform to the transducer 102.

The function generator 114, amplifier 118, and impedance matching device 122 perform analogously to function generator 112, amplifier 116, and impedance matching device 120. In alternate implementations, one or more of the controller 110, the function generators 112 and 114, the amplifiers 116 and 118, and the impedance matching devices 120 and 122 may be combined. For example, the function generator 112, amplifier 116, and impedance matching device 120 may be combined into one or more digital signal processors, as will be appreciated by those skilled in the art.

The transducers 102 and 104 receive the impedance-matched waveforms and generate corresponding waves within the cavity 108. The waves reflect off inner walls of the cavity and create a wave field within the cavity. The wave controller 106 selects the waveform characteristics such that the wave field within the cavity 108 forms a standing wave field. The wave controller 106 employs the feedback controller 124 to determine the presence of the standing wave field and adjust the waveform characteristics provided to the function generators as needed to maintain the standing wave field. The wave controller 106 and the transducers 102 and 104 in one example cooperate to create the standing wave fields within the cavity 108. The standing wave fields may comprise mechanical wave fields, electromagnetic wave fields, or both mechanical and electromagnetic wave fields concurrently. In another implementation, the standing wave fields may be alternately turned on and off or the phase between two or more transducers can be altered to control the position and orientation of the collected/shaped particles.

The cavity 108 in one example comprises one or more mediums 128. In a first example, the medium 128 provides a transport mechanism for the mechanical waves. In a second example, the medium 128 provides a support mechanism (e.g., host medium) for particles within the cavity 108, as described herein. Examples of the medium 128 comprise fluids (gas or liquid) such as air, water, colloidal fluids, or alternate mediums known to those skilled in the art. The medium 128 is optional if the wave field uses only electromagnetic waves since electromagnetic waves can travel through a vacuum, as will be appreciated by those skilled in the art.

Figure 2:
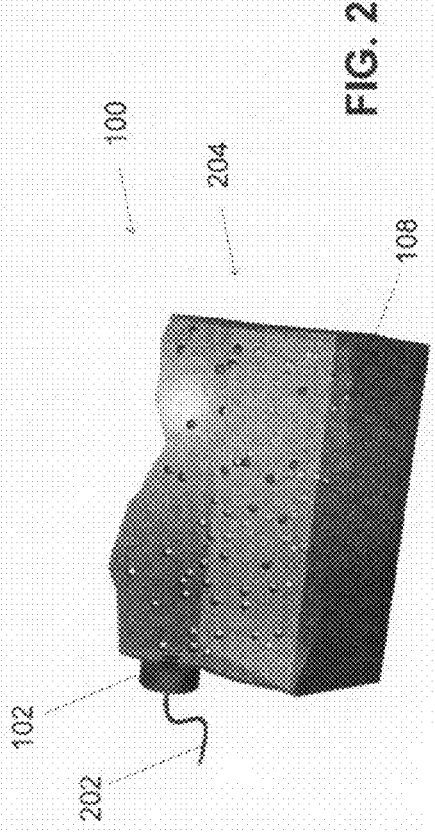
FIG. 2 is a representation of a perspective view of the cavity and transducer of the apparatus of FIG. 1 illustrating particles in a random distribution within the cavity without an active wave field.

An illustrative description of operation of the apparatus 100 is presented, for explanatory purposes. Turning to FIG. 2, the transducer 102 is shown coupled with the cavity 108 and is communicatively coupled with the wave controller 106 via a cable 202. A plurality of particles 204 are located within the cavity 108 and the standing wave field from the transducer 102 is "off". The particles 204 are substantially free-floating within the cavity 108. In one implementation where the particles 204 are relatively large, a micro-gravity or near zero gravity environment may be employed to allow the particles 204 to float. In another implementation, the medium 128 provides the support mechanism that allows the particles to float within the cavity 108 and a reduced gravity field is not necessary. The particles 204 may comprise different materials, molecules, or other particulate matter. In another implementation, larger building blocks may be used in place of and/or with smaller blocks or particles. Example materials for the particles 204 comprise aluminum or other metals, aluminum oxide, silicon dioxide, polymers, ceramics, semiconductors, composites, organic or inorganic materials, or other materials or particles that have a different impedance than a host medium within the cavity 108, as will be appreciated by those skilled in the art. The particles 204 may be sized from nanometer-scale up to centimeter and meter-scale components. In one example, the wave controller 106 selects the wavelength of the wave for the standing wave field such that the particles remain in the Rayleigh regime. In this example, the particles are approximately one order of magnitude or smaller than the wavelength.

Figure 4:
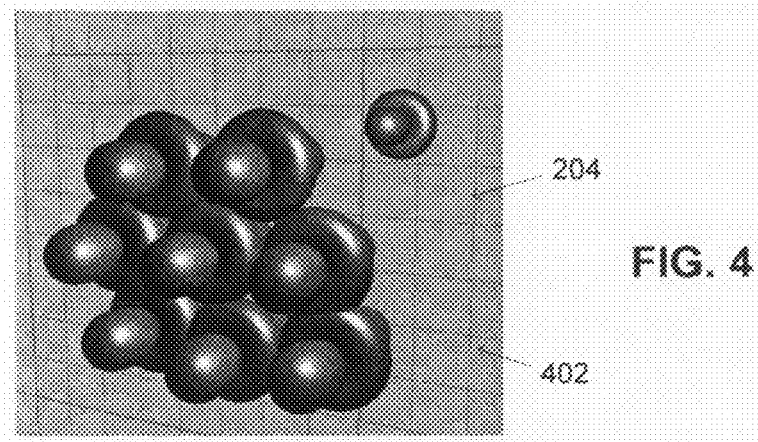
FIG. 4 is a perspective representation of a plurality of particles and illustrates shaping of a single-particle thick surface with the plurality of particles due to an acoustic field.
Figure 5:
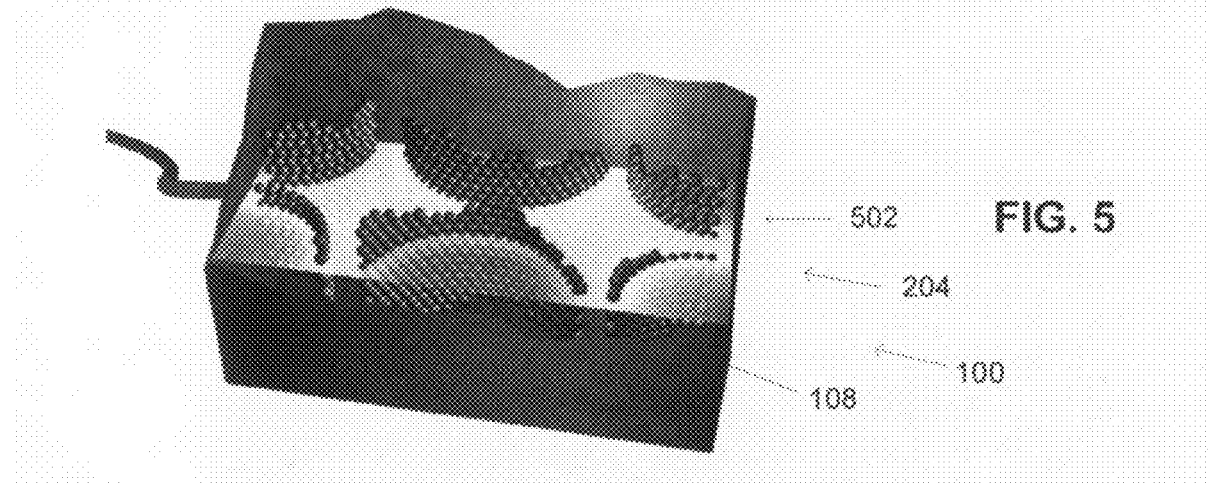
FIG. 5 is a perspective representation of a plurality of particles and illustrates shaping of a single-particle thick surface with the plurality of particles within the cavity of the apparatus of FIG. 1 due to an acoustic field.

Turning to FIG. 3, one example of a particle 304, of the plurality of particles 204, is shown when an acoustic standing wave field is generated within the cavity 108. The acoustic standing wave field induces a dipole moment in the particle 304. The particle 304 in the acoustic standing wave field comprises an attraction plane that is spanned by two dimensions 306/308 and 310/312 and repulsion along a third dimension 314/316. Turning to FIG. 4, the plurality of particles 204 within the cavity 108 with an acoustic standing wave field align themselves into a surface 402. In one example, the surface 402 comprises a thickness of one particle. Turning to FIG. 5, a plurality of surfaces 502 are formed from the particles 204 by the acoustic standing wave field. The surfaces are aligned along pressure contours of the acoustic standing wave field, as will be appreciated by those skilled in the art.

Figure 7:
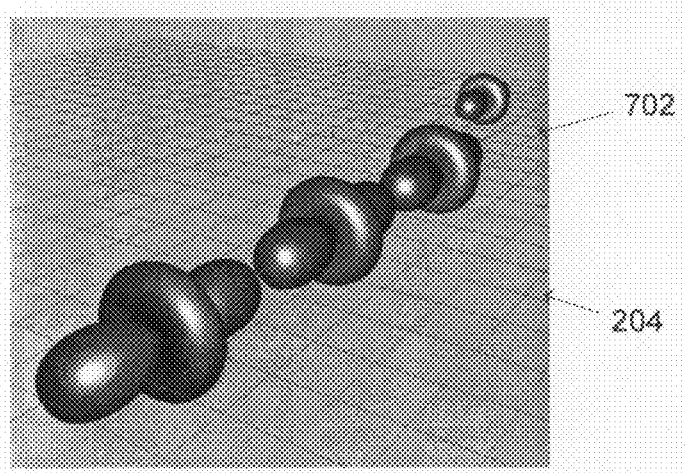
FIG. 7 is a perspective representation of a plurality of particles and illustrates shaping of a single-particle thick chain with the plurality of particles due to an electromagnetic field.
Figure 8:
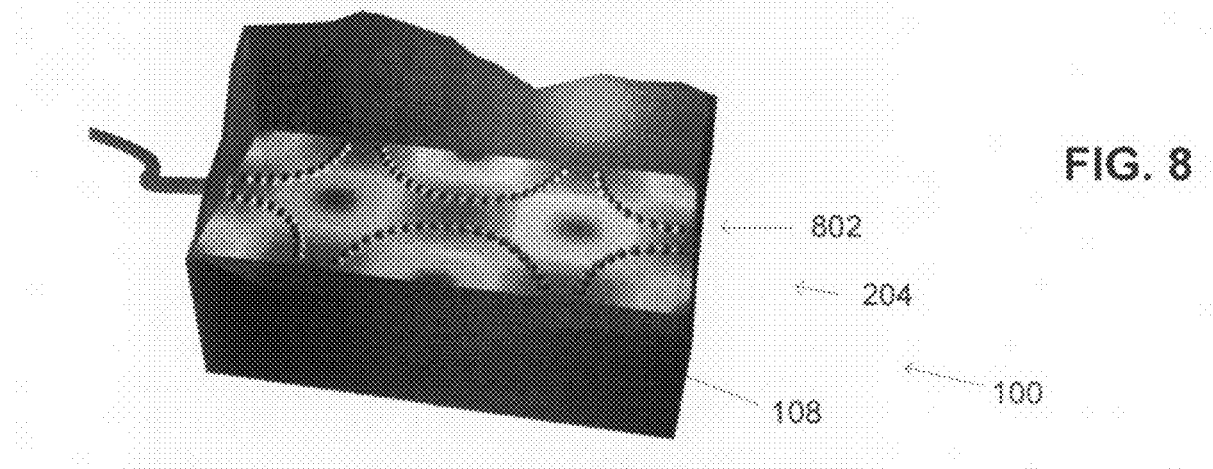
FIG. 8 is a perspective representation of a plurality of particles and illustrates shaping of a single-particle thick chain with the plurality of particles within the cavity of the apparatus of FIG. 1 due to an electromagnetic field.

Turning to FIG. 6, one example of the particle 304 is shown when an electromagnetic standing wave field is generated within the cavity 108. The electromagnetic standing wave field induces a dipole moment in the particle 304. The particle 304 in the electromagnetic standing wave field comprises a repulsion plane that is spanned by two dimensions 406/408 and 410/412 and attraction along a third dimension 414/416. Turning to FIG. 7, the plurality of particles 204 within the cavity 108 with an electromagnetic standing wave field align themselves into a chain 702. In one example, the chain 702 comprises a width of one particle. Turning to FIG. 8, a plurality of chains 802 are formed from the particles 204 by the electromagnetic standing wave field. The chains 802 are aligned along field lines of the electromagnetic standing wave field, as will be appreciated by those skilled in the art.

Figure 9:
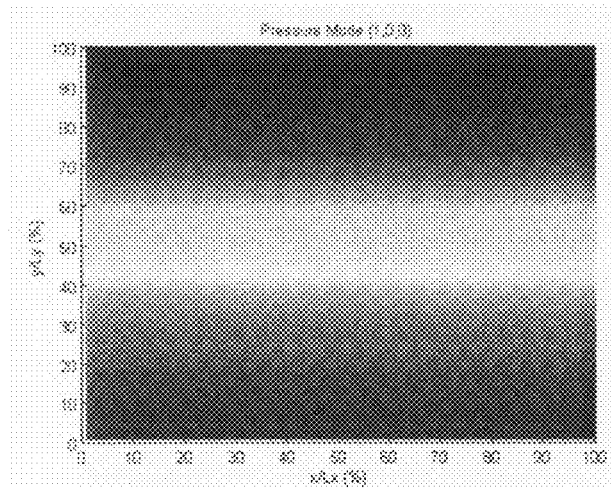
FIGS. 9-11 are representations of example pressure distributions within the cavity of FIG. 2 for various acoustic standing modes.
Figure 10:
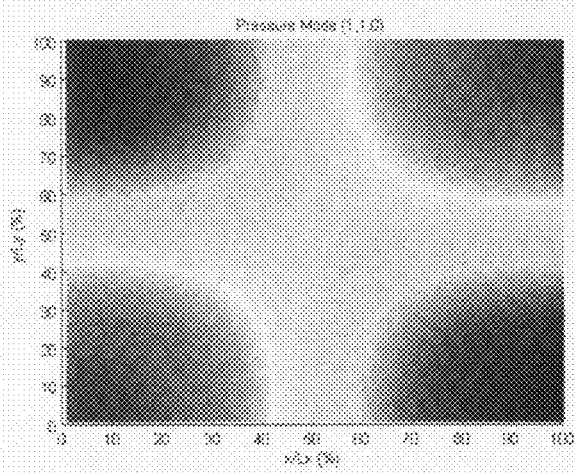
Figure 11:
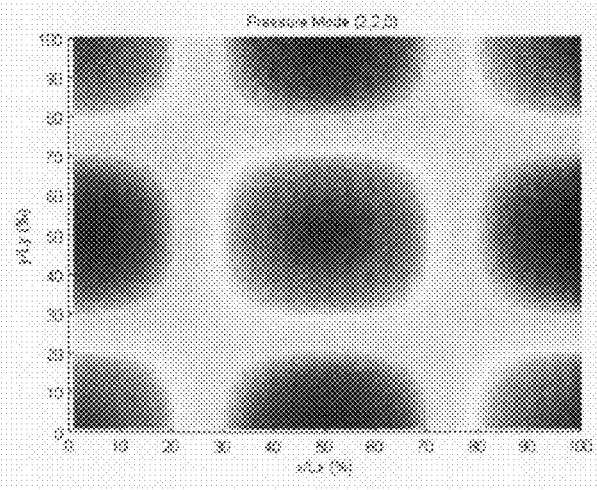

Referring to FIGS. 3-8, the shapes of the surfaces 402 and 502 and chains 702 and 802 are based on mode geometry of the standing wave fields within the cavity 108. Turning to FIGS. 9-11, various pressure distributions are shown for pressure modes (1, 0, 0), (1, 1, 0), and (2, 2, 0). If multiple waveforms are induced in the cavity 108 concurrently, combination pressure modes may be created with more complex shapes. Accordingly, more complex configurations of particles can be constructed, as will be appreciated by those skilled in the art.

The wave controller 106 in one example determines and/or adjusts the waveform characteristics of the waves within the cavity 108 to control the shape of the surfaces and chains, for example, through communication with the transducers. In another example, the wave controller 106 determines and/or adjusts a shape of the cavity 108 to control the shape of the surfaces and chains. In one example, the cavity 108 comprises a rectangular cavity with one or more adjustable dimensions.

The wave controller 106 in one implementation causes a first standing wave field in the cavity 108 to form the particles 204 into a desired configuration. The wave controller 106 in one example causes a second wave field with different waveform characteristics than the first standing wave field to induce a heating of the particles 204. The particles 204 and the waveform characteristics of the second wave field are selected such that the particles 204 are sufficiently heated to cause them to fuse together. For example, the transducer that creates the second wave field comprises a fusing component. The second wave field may comprise a standing wave or a traveling wave. In this implementation, the first standing wave field may be caused by acoustic and/or electromagnetic waves. In one example, an acoustic wave causes the particles 204 to form into the desired configuration and an electromagnetic wave causes the particles 204 to fuse together into the configuration. In another example, an electromagnetic wave is used to form the particles 204 into the desired configuration and an ultrasound (i.e., acoustic) wave is used to fuse the particles 204 together. In yet another example, a first and second acoustic wave is used to form the particles 204 and a third acoustic wave is used to fuse the particles 204 together. Additional combinations of mechanical and/or electromagnetic waves will be apparent to those skilled in the art.

In another implementation, the wave controller 106 induces the standing wave fields at different times. For example, the wave controller 106 may induce a first standing wave field to form the particles 204 into the desired configuration. At a later time, for example, to allow time for the particles to settle into the desired configuration, the wave controller 106 may induce the second standing wave field to fuse or solidify the particles. In yet another implementation, the wave controller 106 may form a first set of particles into a first configuration at a first time. A second set of particles may then be added to the cavity 108. The wave controller 106 may then form the second set of particles into a second desired configuration at a second time. In a further example, the wave controller 106 may be configured to fuse the first set of particles in the first configuration with the second set of particles in the second configuration. In this way, the wave controller 106 may create complex objects from the particles, as will be appreciated by those skilled in the art.

Turning to FIGS. 12-13, in another implementation, the apparatus 100 further comprises a same-charge source 1202. Referring to FIG. 13, the same-charge source 1202 is configured to induce an electric charge in one or more of the plurality of particles 204. In one example, the same-charge source 1202 comprises an electron gun configured to bombard the particles 204 with electrons 1304.

Referring to FIG. 13(a), the particles 204 are "roughly" aligned along a standing wave field in the cavity 108. In FIG. 13(b), the electric charge induced by the same-charge source 1202 induces a monopole field in the particles 204. When the particles 204 have the induced monopole field, the resulting interparticle forces between the particles 204 cause them to repel each other. Referring to FIG. 13(c), as the electric charge on the particles 204 dissipates, the fields about the particles 204 return to a dipole field and the particles attract each other along the directions described above. As the charge dissipates, the particles 204 in one example re-align more closely to the desired shape of the standing wave field in the cavity 108, which results in a more smooth surface or chain, as will be appreciated by those skilled in the art. The wave controller 106 in one example is communicatively coupled with the same-charge source 1202 and controls the same-charge source 1202.

Figure 14:
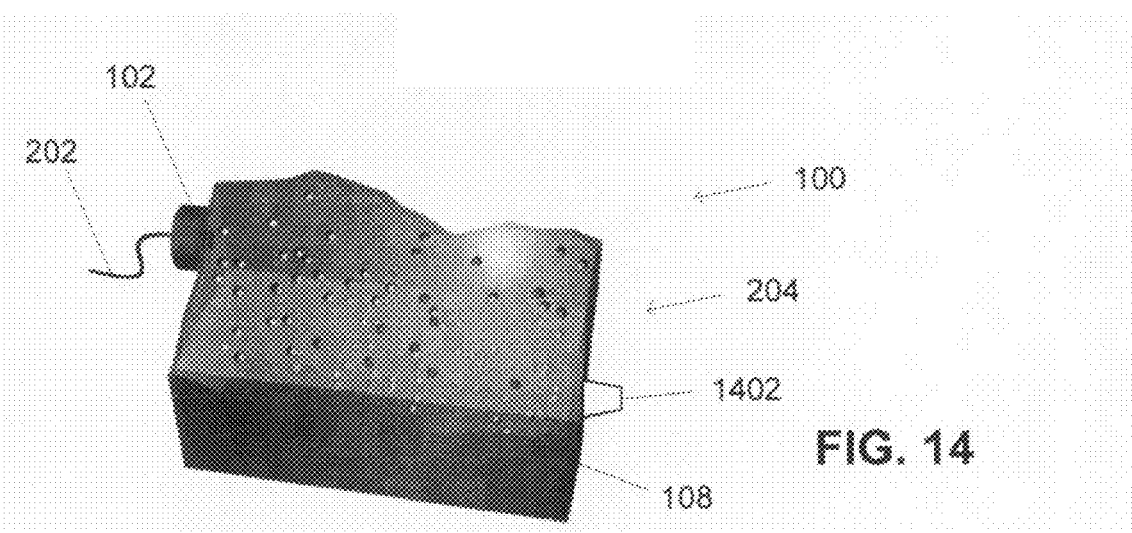
FIG. 14 is a representation of yet another implementation of the apparatus of FIG. 2 and further illustrates a transducer that induces a resonance in the particles.

Turning to FIG. 14, in yet another implementation, the apparatus 100 further comprises a transducer 1402. The transducer 1402 is configured to induce a resonance in the individual particles 204. In one example, the transducer 1402 sends a wave through the cavity to the particles 204. The wave may be either a traveling wave or standing wave. When the particles 204 receive waves at a resonance frequency $f_{resonance}$ of the particles, a resonant response is induced, which enhances the local polarization of the particles 204. This resonant response in one example causes an increase in the dipole field of the particles 204, which in turn causes an increase in one or more of the field-induced forces exerted by the standing wave field of the cavity 108 and the dipole-dipole forces between the plurality of particles 204, as will be appreciated by those skilled in the art. The transducer 1402 in one example is communicatively coupled with the wave controller 106.

The wave controller 106 in one example causes the particles 204 to fuse using an alternate mechanism. For example, a chemical curing process may be used to solidify the particles 204 in the desired configuration. In another example, a light source (e.g., a laser or ultraviolet light source) or thermal energy source may be used to heat one or more of the medium 128, the cavity 108, and the particles 204 (e.g., a baking, sintering, or welding process).

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one example orientation of the apparatus 100, for explanatory purposes.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 126 of the wave controller 106. The computer-readable signal-bearing medium for the apparatus 100 in one example comprise one or more of a magnetic, electrical, optical, biological, and atomic data storage medium. For example, the computer-readable signal-bearing mediums may comprise floppy disks, magnetic tapes, CD-ROMs, DVD-ROMs, hard disk drives, and/or electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
    at least one transducer configured to generate a first wave field within a cavity, wherein the first wave field exerts first field-induced forces on a plurality of particles within the cavity to align the plurality of particles in a desired configuration;
    wherein the at least one transducer is configured to generate a second wave field within the cavity, wherein the second wave field causes one or more of the plurality of particles within the cavity to fuse into a structure with the desired configuration;
    wherein the at least one transducer is configured to generate a third wave field within the cavity, wherein the third wave field exerts a translational force on the structure to move the structure.

2. The apparatus of claim 1, wherein the at least one transducer comprises a transducer;
    wherein the transducer is configured to generate the first wave field, the second wave field, and the third wave field.

3. The apparatus of claim 1, wherein one or more of the first, second and third wave fields comprise an acoustic standing wave field.

4. The apparatus of claim 1, wherein one or more of the first, second, and third wave fields comprise an ultrasonic wave field.

5. The apparatus of claim 1, wherein the first, second, and third wave field comprise at least one acoustic wave field and at least one electromagnetic field.

6. The apparatus of claim 1, wherein the at least one transducer comprises a plurality of transducers that are configured to generate the first, second, and third wave fields.

7. The apparatus of claim 1, wherein the plurality of particles comprise a first set of particles and a second set of particles;
wherein the first wave field exerts the first field-induced forces to cause the first set of particles to align in a first desired configuration;
wherein the second wave field causes the first set of particles to fuse into a first structure with the first desired configuration;
wherein the at least one transducer is configured to generate a fourth wave field within the cavity, wherein the fourth wave field exerts second field-induced forces to cause the second set of particles to align in a second desired configuration;
wherein the at least one transducer is configured to generate a fifth wave field within the cavity, wherein the fifth wave field causes the second set of particles to fuse into a second structure with the second desired configuration.

8. The apparatus of claim 7, wherein the at least one transducer is configured to generate a sixth wave field, wherein the sixth wave field causes the first structure and the second structure to fuse together.

9. The apparatus of claim 1, further comprising:
a wave controller communicatively coupled with the at least one transducer;
wherein the wave controller is configured to provide one or more signals to the at least one transducer to generate the first wave field, the second wave field, and the third wave field.

10. The apparatus of claim 9, wherein the wave controller comprises an impedance matching device configured to match an impedance of the one or more signals to the cavity.

11. The apparatus of claim 9, wherein the wave controller selects a wavelength of a wave for the first wave field such that the particles are approximately one order of magnitude or smaller than the wavelength.

12. The apparatus of claim 11, wherein the particles comprise nano-scale particles.

13. The apparatus of claim 9 in combination with the cavity, wherein the cavity comprises an adjustable shape;
wherein the wave controller is configured to adjust the shape of the cavity and one or more waveform characteristics of the one or more signals to generate the first, second, and third wave fields.

14. The apparatus of claim 9, wherein the third wave field comprises a first wave component and a second wave component;
wherein the wave controller alters a phase difference between the first wave component and the second wave component to move the structure within the cavity.

15. The apparatus of claim 1, wherein the cavity contains a fluid;
wherein the plurality of particles are dispersed within the fluid.

16. The apparatus of claim 1, wherein the particles align within the cavity in the desired configuration with a thickness of one particle.

17. The apparatus of claim 1, wherein the at least one transducer is configured to generate the first wave field from a standing wave within the cavity.

18. The apparatus of claim 1, wherein a frequency of the second wave field is higher than a frequency of the first wave field.

19. The apparatus of claim 1, wherein the plurality of particles comprise a first set of particles and a second set of particles;
wherein the first wave field exerts the first field-induced forces to cause the first set of particles to align in the desired configuration;
wherein the second wave field causes the first set of particles to fuse into a first structure with the desired configuration;
wherein the at least one transducer is configured to generate a fourth wave field within the cavity, wherein the fourth wave field exerts second field-induced forces to cause the second set of particles to align in the desired configuration;
wherein the at least one transducer is configured to generate a fifth wave field within the cavity, wherein the fifth wave field causes the second set of particles to fuse into a second structure with the desired configuration.

20. An apparatus, comprising:
at least first, second, third, and fourth transducers;
wherein the first transducer is configured to generate a first wave field within a cavity;
wherein the second transducer is configured to generate a second wave field within the cavity;
wherein the first and second transducers cooperate to employ the first wave field and the second wave field to induce respective first and second field-induced forces to cause a set of particles within the cavity to align in a desired configuration;
wherein the third transducer is configured to generate a third wave field within the cavity to cause one or more of the set of particles to fuse into a structure with the desired configuration;
wherein the fourth transducer is configured to generate a fourth wave field within the cavity to exert a translational force on the structure to move the structure.

21. The apparatus of claim 20, wherein the first transducer and the second transducer concurrently generate the first and second wave fields.

22. An apparatus, comprising:
at least one transducer configured to generate a wave field within a cavity, wherein the wave field exerts field-induced forces on a set of particles within the cavity to cause the set of particles to align in a desired configuration; and
at least one same-charge source configured to induce a monopole field in one or more particles of the set of particles to adjust a distribution of the set of particles within the desired configuration.

23. The apparatus of claim 22, wherein the at least one same-charge source comprises an electron gun configured to bombard the set of particles with electrons to induce the monopole field.

24. The apparatus of claim 22, wherein the monopole field causes the one or more particles to repel each other;
wherein the one or more particles re-align as the monopole field dissipates and the one or more particles return to a dipole field.

25. An apparatus, comprising:
at least one transducer configured to generate a wave field within a cavity, wherein the wave field exerts field-induced forces on a set of particles within the cavity to cause the set of particles to align in a desired configuration;

wherein the at least one transducer is configured to send a wave through the cavity at a resonant frequency of the set of particles to induce a resonant response in the set of particles;

wherein the resonant response causes an increase in a dipole field of the set of particles;

wherein the increase in the dipole field increases the field-induced forces exerted by the wave field on the set of particles.

* * * * *